Patented Aug. 30, 1927.

1,640,639

UNITED STATES PATENT OFFICE.

HENRI BLUM, OF MULHOUSE, FRANCE, ASSIGNOR TO SOCIÉTÉ ALSACIENNS DE PRODUITS CHIMIQUES, OF PARIS, FRANCE.

MANUFACTURE OF BORNEOL ESTERS.

No Drawing. Application filed March 18, 1925, Serial No. 16,581, and in France March 28, 1924.

Since the fundamental work of Bouchardat and Laffont, numerous authors have dealt with the question of the direct transformation of pinene and camphene into borneol esters by condensation with an organic acid.

There has been a number of Letters Patent relating to this reaction, each being concerned with the use of a certain acid. Among the acids used have been acetic acid, orthochlorobenzoic acid, oxalic acid, salicyclic acid, sebacic acid, phthalic acid and their derivatives.

None of these processes has been industrially worked because the condensation of each of the acids in question with pinene is accompanied by a secondary reaction which consists in an isomerization of the pinene to dipentene, limonene, terpilene and other hydrocarbons useless for the synthesis of borneol. According to the nature of the acid used the proportion of the secondary product is great or small; in the most favourable case, namely that of salicylic acid, the proportion of secondary product exceeds 150 per cent of the quantity of pinene transformed into borneol.

By the present invention there are used for the condensation of pinene into borneol esters acids of the type $$COOH-R-CO-R',$$

wherein R and R' represent aromatic nuclei, their homologues or substitution products. The most typical representatives are orthobenzoylbenzoic acid, orthonaphthoylbenzoic acid, 2:3-dichlorobenzoylbenzoic acid, 3:4-dichlorobenzoylbenzoic acid, 2:4-dichlorobenzoylbenzoic acid, tetrachlorobenzoylbenzoic acid, naphthoyltetrachlorobenzoic acid and their bromine, iodine, nitro, methyl, hydroxyl or alkoxyl derivatives, as well as mixtures of any of them.

The condensation of one of these acids with pinene, which occurs remarkably smoothly, produces a product which may be represented by the general formula

$$C_{10}H_{17}-O-CO-R-CO-R'.$$

By selecting an acid of this series the present invention avoids the defect indicated above; it allows of the almost complete utilization of the spirit of turpentine used in the reaction, for the spirit used in excess remains substantially unchanged and may be returned to the process. In the previously known processes the proportion of pinene transformed into borneol is from 30-40 per cent, but according to this invention the yield is more than doubled.

The new borneol esters are easily saponified by aqueous soda solution and are advantageously distinguished by this fact from the phthalic esters which require alcoholic soda.

The following examples illustrate the invention:—

Example 1.

100 kilos of rectified French spirit of turpentine are mixed with 50 kilos of orthobenzoylbenzoic acid and the mixture is heated to 140° C. The condensation occurs quickly, the acid, which is insoluble in the turpentine, passing gradually into solution. When the reaction is over the excess of turpentine is distilled under reduced pressure and is used for the next operation.

The residue of the distillation consists of bornyl-benzoylbenzoate. It is saponified by shaking it with a slight excess of caustic soda. Saponification is rapid. The borneol ester is distilled with aid of steam.

Example 2.

3 parts of rectified American spirit of turpentine are mixed with 1 part of naphthoylbenzoic acid and the mixture is heated to 130° C. until dissolution is complete.

The excess of spirit used is distilled in steam until it has been completely eliminated.

The borneol naphthoylbenzoate is then saponified by caustic soda solution and the borneol ester isolated by the usual methods.

Turpentines of other origin may be treated in the same manner. It may be stated that camphene is the equivalent of pinene in the present process.

What I claim is:—

1. An improved process for the manufacture of borneol esters from pinene, consisting in condensing the same with an acid of the type COOH—R—CO—R', wherein R and R' represent aromatic nuclei.

2. As new articles of manufacture, the borneol esters obtained by condensing pinene with an acid of the type $$COOH-R-CO-R',$$

wherein R and R' represent aromatic nuclei, said borneol esters being easily saponifiable by aqueous soda solution.

In witness whereof I have hereunto signed my name this 3rd day of March, 1925.

HENRI BLUM.